US008930124B1

(12) United States Patent
Ferreira

(10) Patent No.: US 8,930,124 B1
(45) Date of Patent: Jan. 6, 2015

(54) DYNAMIC SPEED LIMIT GENERATION

(71) Applicant: International Business Machines Corporation, Armonk, NY (US)

(72) Inventor: Jhony R. Ferreira, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/014,501

(22) Filed: Aug. 30, 2013

(51) Int. Cl.
*G06F 19/00* (2011.01)
*G08G 1/052* (2006.01)

(52) U.S. Cl.
CPC .................................... *G08G 1/052* (2013.01)
USPC ............................ 701/119; 701/117; 701/121

(58) Field of Classification Search
USPC .......................................... 701/117, 119, 121
See application file for complete search history.

(56) References Cited

U.S. PATENT DOCUMENTS 7,042,345 B2 5/2006 Ellis
7,176,813 B2 2/2007 Kawamata et al.
8,046,501 B2 10/2011 Gormley
8,255,144 B2 8/2012 Breed et al.
8,280,623 B2 10/2012 Trepagnier et al.
2010/0205060 A1 8/2010 Athsani et al.
2011/0205042 A1* 8/2011 Takemura et al. ............ 340/435
2011/0282576 A1* 11/2011 Cabral et al. .................. 701/201
2012/0065876 A1* 3/2012 Kadowaki et al. ............ 701/300
2012/0083995 A1 4/2012 Vorona
2012/0173069 A1* 7/2012 Tsimhoni et al. ............... 701/25
2012/0173530 A1* 7/2012 Kurciska et al. .............. 707/738
2012/0209505 A1 8/2012 Breed et al.
2012/0283912 A1 11/2012 Lee et al.
2012/0283942 A1* 11/2012 T'Siobbel et al. ............ 701/410
2012/0283945 A1 11/2012 Bird et al.
2013/0013179 A1 1/2013 Lection et al.
2013/0085976 A1* 4/2013 Bone et al. ...................... 706/46
2013/0173113 A1* 7/2013 Takiguchi et al. .............. 701/36
2013/0261960 A1* 10/2013 Wu et al. ........................ 701/465
2013/0282264 A1* 10/2013 Bastiaensen et al. ......... 701/119
2014/0005923 A1* 1/2014 Bank et al. ..................... 701/424
2014/0067187 A1* 3/2014 Ferguson et al. ............... 701/28
2014/0095072 A1* 4/2014 Raab ............................. 701/537

FOREIGN PATENT DOCUMENTS

CN 102542831 7/2012
WO 2009096882 8/2009

OTHER PUBLICATIONS

Schreuder, M.A.; Advanced Traffic Management in the Netherlands, Dynamax, Jun. 23, 2009, 24 pages.
Vlassenroot et al.; Speed management through vehicle measures, Intelligent Transport Systems and Intelligent Speed Assistance; Delft University of Technology; retrieved from the Internet: URL: <www.shlow.eu/documents/shlow-camp/8%20ITS%20and%20ISA.pdf>; retrieved on May 29, 2013; 31 pages.

(Continued)

*Primary Examiner* — Hussein A. Elchanti
(74) *Attorney, Agent, or Firm* — Schmeiser, Olsen & Watts; John Pivnichny

(57) ABSTRACT

A method and system for generating a dynamic speed limit is provided. The method includes dynamically receiving, from vehicles currently in motion on a roadway, a dynamically changing data stream comprising data comprising parameters associated with the vehicles. Speed limits, recommended lane assignments, and velocity ranges for the vehicles are dynamically defined. The speed limits, the recommended lane assignments, and the velocity ranges are transmitted to and presented by each associated vehicle.

20 Claims, 5 Drawing Sheets

(56) References Cited

OTHER PUBLICATIONS

European Road Safety Observatory; Dynamic speed limits; Retrieved from the Internet: <URL: http://erso.swov.nl/knowledge/content/20_speed/dynamic_speed_limits.htm; retrieved on May 29, 2013; 1 page.
Shi et al.; Laser-and-Vision based Probe Car System Toward Realtime Lane-based Traffic Data Collection; 2012 12th International Conference on ITS Telecommunications; Nov. 5-8, 2012; pp. 616-620.
Kostikj et al.; Harmonized Traffic Stream in Urban Environment Based on Adaptive Stop&Go Cruise Control and its Impact on Traffic Flow; 2012 IEEE International Conference on Vehicular Electronics and Safety; Jul. 24-27, 2012; pp. 140-145.
Dubois et al.; Static and Dynamic Speed Limit Map—New Tool for Safer Road; Proceedings of the 14th World Congress on Intelligent Transport Systems (ITS); Oct. 2007; 6 pages.
Pagarkar et al.; Automated Vehicle Control System; Retrieved from the Internet: <URL: www.cs.jhu.edu/~habib/project/AutomatedVehicle.pdf>; retrieved on May 29, 2013; 12 pages.
Wikipedia; Power-to-weight ratio; Retrieved from the Internet: <URL: http://en.wikipedia.org/wiki/Power-to-weight_ratio>; retrieved on May 28, 2013; 23 pages.
Koebler, Jason; New Traffic Management System May Clear the Way for Driver-less Cars; US News; Feb. 17, 2012 [retrieved on May 28, 2013]; Retrieved from the Internet: <URL: http://www.usnews.com/news/articles/2012/02/17/new-traffic-management-system-may-clear-the-way-for-driver-less-cars>; 2 pages.
Kang et al.; Optimal Dynamic Speed-Limit Control for Highway Work Zone Operations; Transportation Research Record: Journal of the Transportation Research Board; No. 1877, TRB, National Research Council, Washington, D.C.; 2004, pp. 77-84.

* cited by examiner

DYNAMIC SPEED LIMIT GENERATION

FIELD

The present invention relates generally to a method for generating a dynamic speed limit, and in particular to a method and associated system for dynamically associating a generated dynamic speed limit with a recommended lane assignment.

BACKGROUND

Determining vehicular functions typically includes an inaccurate process with little flexibility. Associating vehicular functions with geographical locations may include a complicated process that may be time consuming and require a large amount of resources. Accordingly, there exists a need in the art to overcome at least some of the deficiencies and limitations described herein above.

SUMMARY

A first aspect of the invention provides a method comprising: dynamically receiving, by a computer processor of a computing system from a plurality of vehicles currently in motion on a roadway, a dynamically changing data stream comprising data comprising parameters associated with the plurality of vehicles, wherein said computing system comprises a centralized computing system associated with a specified geographical region; analyzing, by the computer processor, the data; dynamically defining, by the computer processor based on results of the analyzing, speed limits for the plurality of vehicles; dynamically defining, by the computer processor based on results of the analyzing, recommended lane assignments for the plurality of vehicles, wherein each recommended lane assignment of the recommended lane assignments specifies a recommended lane of travel on the roadway for each the vehicle; dynamically defining, by the computer processor based on each recommended lane of travel and the speed limits, velocity ranges for the plurality of vehicles with respect to the recommended lane assignments; and transmitting, by the computer processor to each vehicle, an associated speed limit of the speed limits, an associated recommended lane assignment of the recommended lane assignments, and an associated velocity range of the velocity ranges, wherein each vehicle presents each associated speed limit, each associated recommended lane assignment, and each associated velocity range to an associated driver of each associated vehicle of the plurality of vehicles.

A second aspect of the invention provides a computing system comprising a computer processor coupled to a computer-readable memory unit, the memory unit comprising instructions that when executed by the computer processor implements a method comprising: dynamically receiving, by the computer processor from a plurality of vehicles currently in motion on a roadway, a dynamically changing data stream comprising data comprising parameters associated with the plurality of vehicles, wherein said computing system comprises a centralized computing system associated with a specified geographical region; analyzing, by the computer processor, the data; dynamically defining, by the computer processor based on results of the analyzing, speed limits for the plurality of vehicles; dynamically defining, by the computer processor based on results of the analyzing, recommended lane assignments for the plurality of vehicles, wherein each recommended lane assignment of the recommended lane assignments specifies a recommended lane of travel on the roadway for each the vehicle; dynamically defining, by the computer processor based on each recommended lane of travel and the speed limits, velocity ranges for the plurality of vehicles with respect to the recommended lane assignments; and transmitting, by the computer processor to each vehicle, an associated speed limit of the speed limits, an associated recommended lane assignment of the recommended lane assignments, and an associated velocity range of the velocity ranges, wherein each vehicle presents each associated speed limit, each associated recommended lane assignment, and each associated velocity range to an associated driver of each associated vehicle of the plurality of vehicles.

A third aspect of the invention provides a computer program product, comprising a computer readable hardware storage device storing a computer readable program code, the computer readable program code comprising an algorithm that when executed by a computer processor of a computer system implements a method, the method comprising: dynamically receiving, by the computer processor from a plurality of vehicles currently in motion on a roadway, a dynamically changing data stream comprising data comprising parameters associated with the plurality of vehicles, wherein said computing system comprises a centralized computing system associated with a specified geographical region; analyzing, by the computer processor, the data; dynamically defining, by the computer processor based on results of the analyzing, speed limits for the plurality of vehicles; dynamically defining, by the computer processor based on results of the analyzing, recommended lane assignments for the plurality of vehicles, wherein each recommended lane assignment of the recommended lane assignments specifies a recommended lane of travel on the roadway for each the vehicle; dynamically defining, by the computer processor based on each recommended lane of travel and the speed limits, velocity ranges for the plurality of vehicles with respect to the recommended lane assignments; and transmitting, by the computer processor to each vehicle, an associated speed limit of the speed limits, an associated recommended lane assignment of the recommended lane assignments, and an associated velocity range of the velocity ranges, wherein each vehicle presents each associated speed limit, each associated recommended lane assignment, and each associated velocity range to an associated driver of each associated vehicle of the plurality of vehicles.

The present invention advantageously provides a simple method and associated system capable of determining vehicular functions.

DETAILED DESCRIPTION

Figure 1:
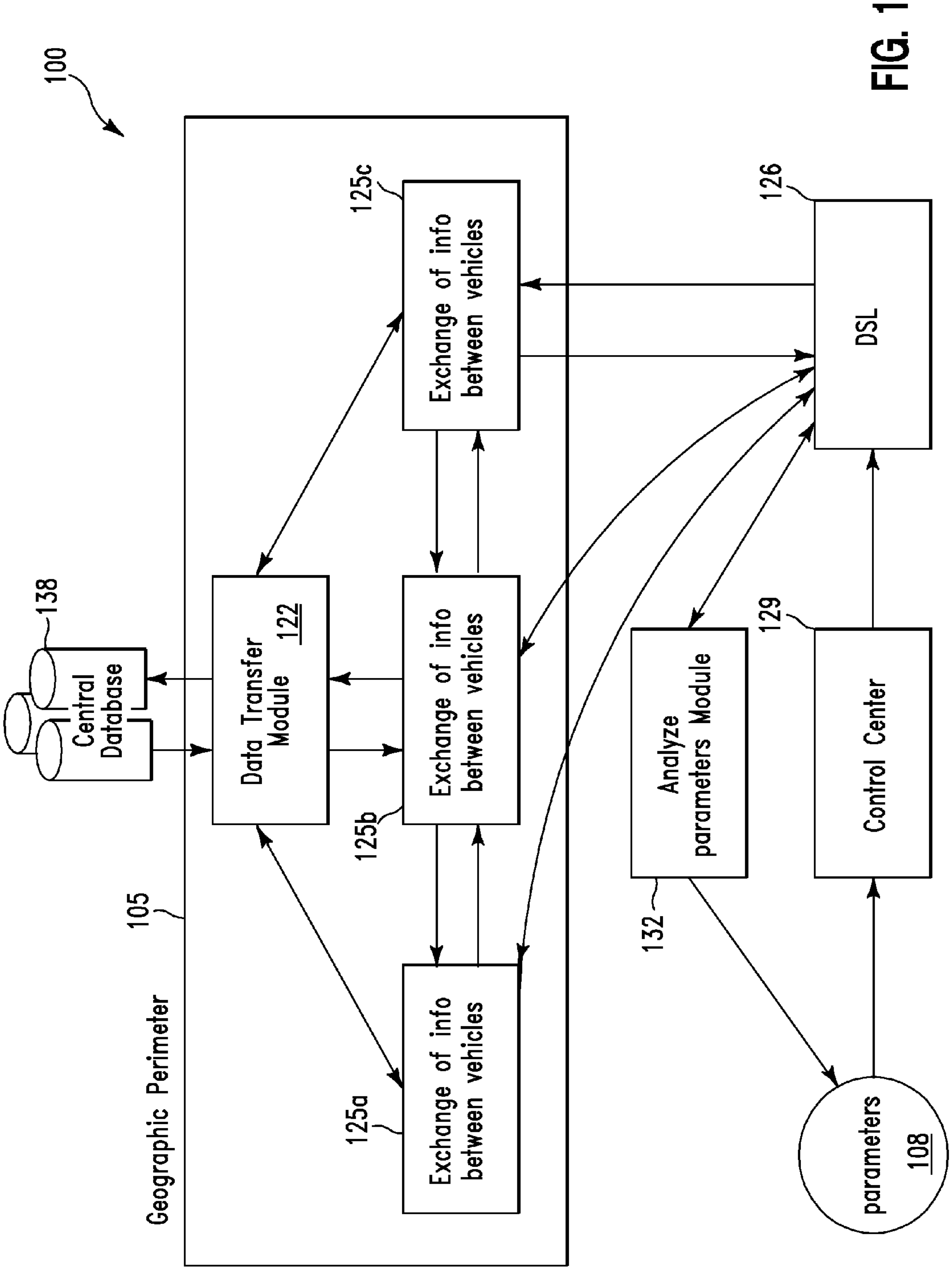
FIG. 1 illustrates a system for dynamically generating and associating a generated speed limit with a recommended lane assignment, in accordance with embodiments of the present invention.

FIG. 1 illustrates a system 100 for dynamically generating and associating a generated speed limit with a recommended lane assignment, in accordance with embodiments of the present invention. System 100 enables a method for optimizing a traffic flow on highways via dynamic control of a speed limit for each vehicle on a roadway. Additionally, system 100 generates a range of velocities comprising different speed limits associated with each vehicle and/or lane on the roadway. System 100 generates a dynamic speed limit for each vehicle at any location on the roadway. The dynamic speed limit(s) may be generated based on various parameters (e.g., a condition of a vehicle, a class of the vehicle in accordance with a manufacturer specification, a vehicle weight vs. a power of the vehicle, a roadway quality, a climate/weather conditions, a general security of the vehicle, etc.).

System 100 of FIG. 1 includes vehicles 125*a* . . . 125*n* (within a specified geographical perimeter 105) communicatively connected to: each other, a data transfer module 122, and a dynamic speed limit (DSL) module 126. System 100 additionally includes: a parameters retrieval module 108, an analyze parameters module 132, and a control center 127 connected to DSL 126 and a data base connected to data transfer module 122. Control center 127 continuously monitors geographical perimeter 105. Additionally, vehicles 125*a* . . . 125*n* continuously and simultaneously exchange data regarding driving parameters. The data is transmitted to control center 127 for analysis and based on the analysis and analysis of parameters, a new dynamic speed limit is assigned to each of vehicles 125*a* . . . 125*n*. The parameters may include, inter alia:

1. A year of vehicles 125*a* . . . 125*n*.
2. A class of vehicles 125*a* . . . 125*n* (e.g., sport vehicle, luxury vehicle, etc.).
3. Weight vs. power of vehicles 125*a* . . . 125*n* (e.g., an actual speed that a vehicle may achieve within a standard of safety).
4. Roadway quality.
5. Climate conditions.

Each of vehicles 125*a* . . . 125*n* comprises a computer including artificial intelligence. Each computer (of vehicles 125*a* . . . 125*n*) is in constant communication with control center 127 thereby generating a map (based on the aforementioned parameters) of vehicles 125 . . . 125*n* within specified geographical perimeter 105. Based on the map, DSL module 126 continuously generates differing speed limits and lanes of travels for each of vehicles 125*a* . . . 125*n* during a route of travel. Additionally, DSL module 126 may generate velocity ranges with respect to a specified lane of travel for each of vehicles 125*a* . . . 125*n*.

Figure 2:
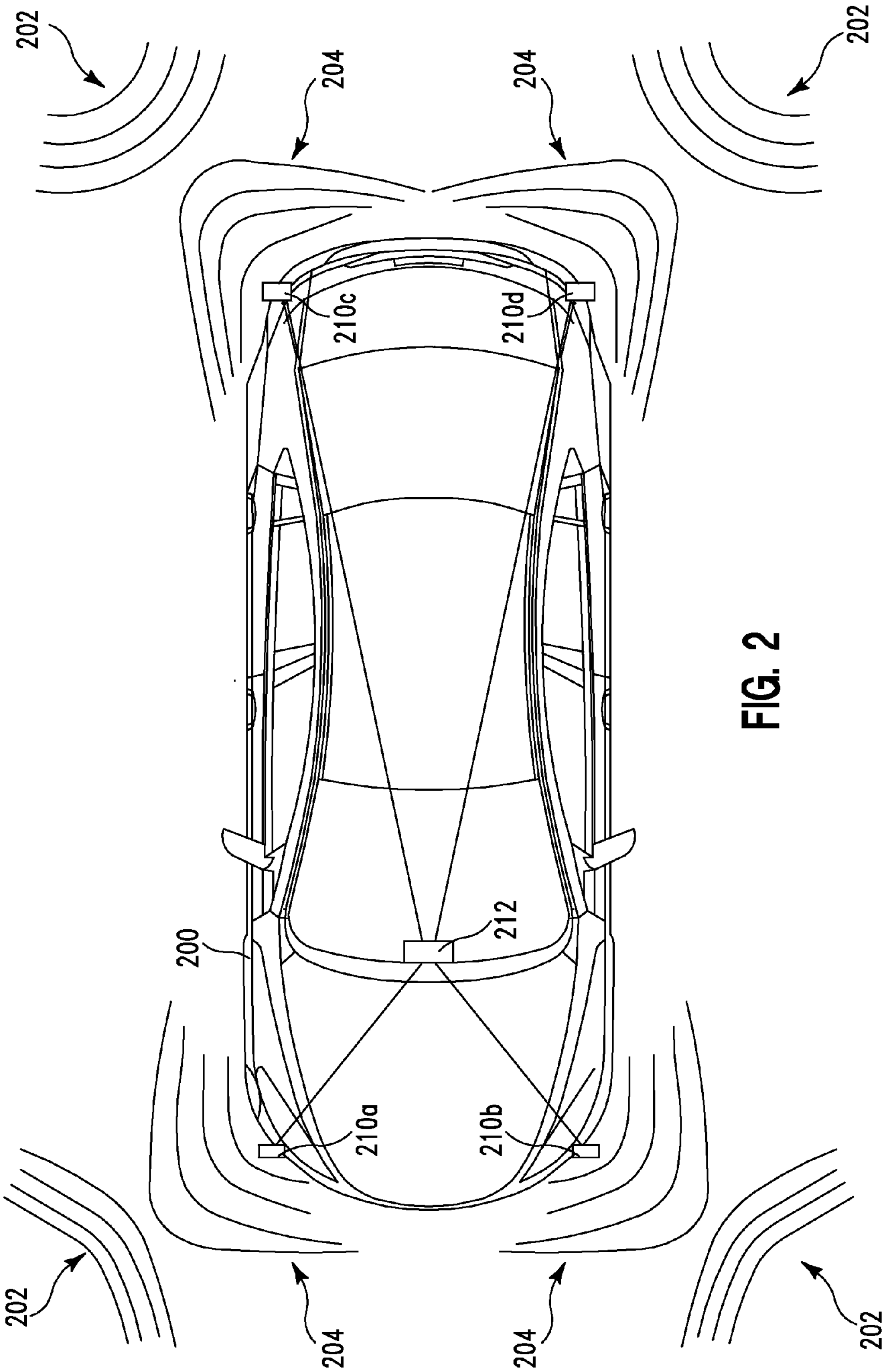
FIG. 2 illustrates a vehicle comprising an internal computer comprising a control center for dynamically generating and associating a generated speed limit with a recommended lane assignment, in accordance with embodiments of the present invention.
Figure 3:
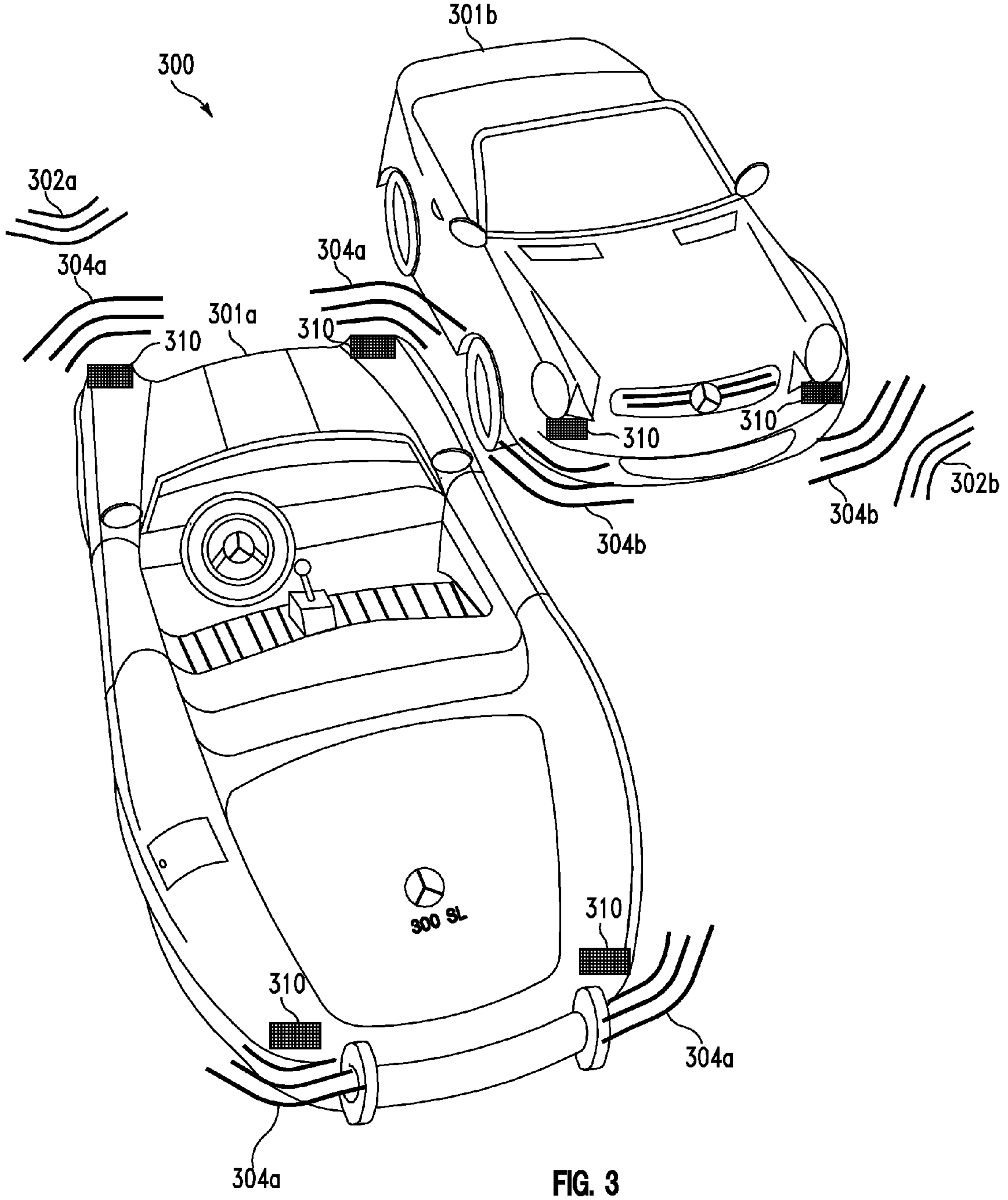
FIG. 3 illustrates multiple vehicles communicating with each other for dynamically generating and associating a generated speed limit with a recommended lane assignment, in accordance with embodiments of the present invention.

Each of vehicles 125*a* . . . 125*n* may comprise a plurality of sensors (e.g., one sensor in each corner of vehicles 125*a* . . . 125*n* as illustrated in FIGS. 2 and 3) for generating a 360 degree signal for communications between vehicles 125*a* . . . 125*n*. Each computer (of vehicles 125*a* . . . 125*n*) includes an artificial intelligence system for managing communications between vehicles 125*a* . . . 125*n* and transmitting vital information to control center 127. Each computer is communicatively connected to any of a vehicle's systems such as, inter alia, a motor, a speedometer, a control panel, and any additional systems that generate information for motorists. The information is analyzed by DSL module 126 to generate a driver's goals such as, inter alia, a dynamic speed limit, etc. Additionally, control center 127 for geographical perimeter 105 may be communicatively connected to additional control centers for different geographical perimeters and/or a central database 138 comprising information from all users of DSL module 126.

In order to reduce system flaws, control poles may be placed in specified high traffic locations. Therefore, if a vehicle has disabled communications an exchange of signals (i.e., a ping) is initiated when the vehicle comes in range of a control pole. If no response is detected, a photo of the vehicle (e.g., a license plate) is generated and transmitted to database 138 and/or control center 127. Database 138 and/or control center 127 may transmit data describing the vehicle to a nearest checkpoint at within geographical perimeter for determining an associated action.

Control center 127 is responsible for the area within geographical perimeter receives data via, for example, a cellular network, a satellite network, an RF network, etc. In response, each of vehicles 125*a* . . . 125*n* may communicate with each other. When new information is received, the computers (of vehicles 125*a* . . . 125*n*) transmit the information to database 138. Control center 127 processes data from a geographic region within geographical perimeter and calculates differing speed limits, velocity ranges and/or a specified lane of travel for each of vehicles 125*a* . . . 125*n*. Additionally, each lane may be assigned a specified speed limit. Therefore, each driver of an associated one of vehicles 125*a* . . . 125*n* receives a message indicating an associated speed limit, velocity range and/or a specified lane of travel. Each associated speed limit, velocity range and/or a specified lane of travel is continuously updated based on changing parameters and/or conditions.

System 100 of FIG. 1 performs the following process for dynamically generating and associating a generated speed limit with a recommended lane assignment:

Control center 127 continuously receives and analyzes data (e.g., comprising the aforementioned parameters) from vehicles 125*a* . . . 125*n*. In response, control center 127 defines dynamic speed limits and associated lane recommendations for each of vehicles 125*a* . . . 125*n*. Additionally, a range for a specified lane may be generated. For example, control center 127 may recommend that vehicle 125*a* travels on a center lane comprising a maximum speed limit (i.e., specifically for vehicle 125*a*) of 160 km/h and a minimum speed limit (i.e., specifically for vehicle 125*a*) of 120 km/h. If a driver of vehicle 125*a* prefers to travel at a speed external to the range, the driver is directed to change lanes. The above process continuously loops so that each vehicle is constantly receiving different speed limits and options for optimizing a flow of traffic. For example, above process may determine a specified lane of travel a driver of vehicle 125*a* that comprises an optimal lane of travel for a specified timeframe.

FIG. 2 illustrates a vehicle 200 comprising an internal computer 212 comprising a control center for dynamically generating and associating a generated speed limit with a recommended lane assignment, in accordance with embodiments of the present invention. Vehicle 200 comprises integrated sensors 210*a* . . . 210*d* for receiving data signals 202 and transmitting data signals 204. The sensors may include, inter alia, RF sensors, satellite sensors, optical sensors, sonar sensors, etc. Data signals 202 are received via sensors 210*a* . . . 210*d* and transmitted to internal computer 212 for analysis. In response, a dynamic speed limit and/or lane recommendation is generated and additionally related data is transmitted to additional vehicles and/or a centralized system via data signals 204.

FIG. 3 illustrates vehicles 301*a* and 301*b* communicating with each other for dynamically generating and associating a generated speed limit with a recommended lane assignment, in accordance with embodiments of the present invention. Vehicle 301*a* comprises integrated sensors 310 for receiving data signals 302*a* and transmitting data signals 304*a*. Vehicle 301*b* comprises integrated sensors 310 for receiving data signals 302*b* and transmitting data signals 304*b*.

Figure 4:
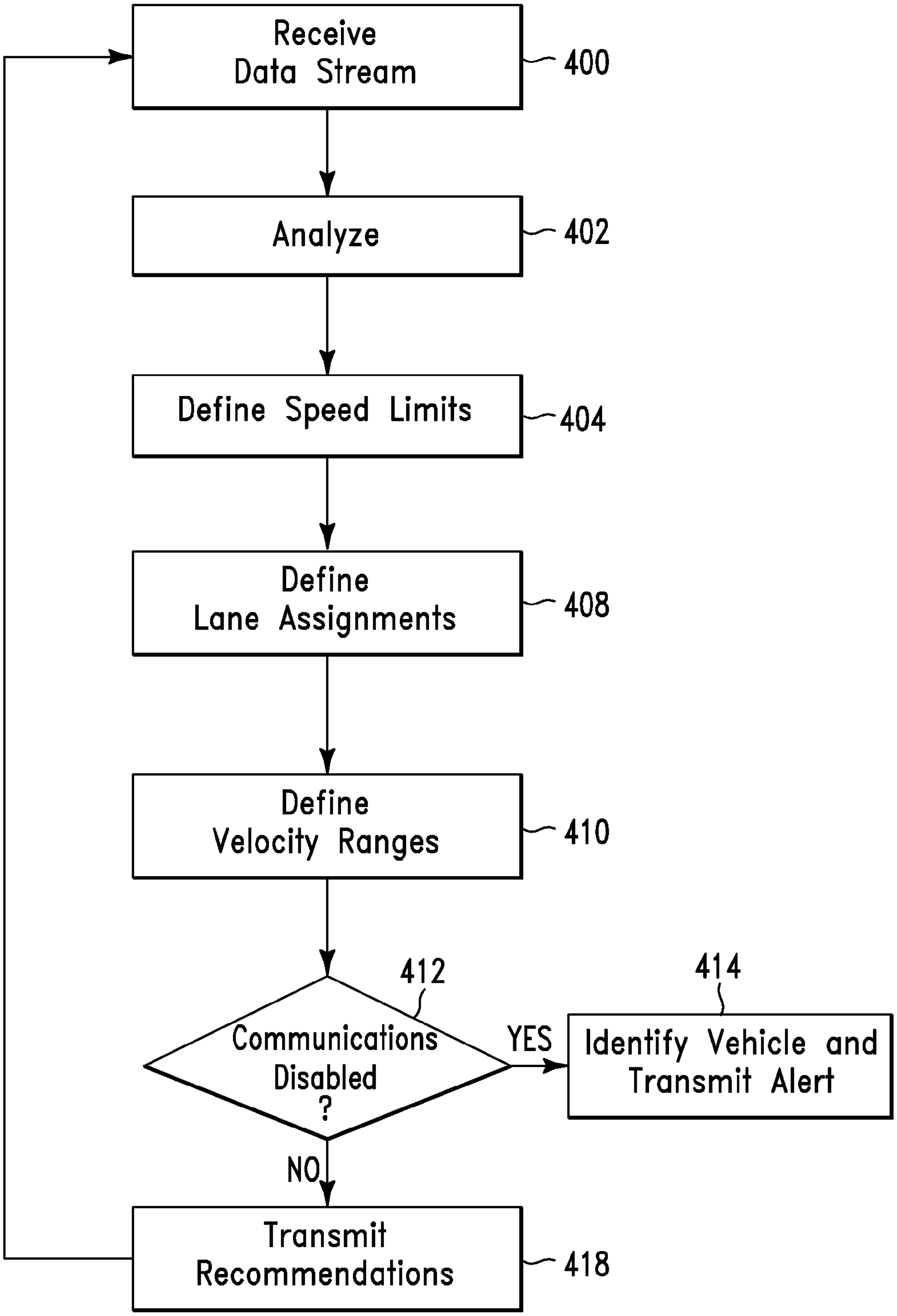
FIG. 4 illustrates an algorithm detailing a process flow enabled by the system of FIG. 1 for dynamically generating and associating a generated speed limit with a recommended lane assignment, in accordance with embodiments of the present invention.

FIG. 4 illustrates an algorithm detailing a process flow enabled by system 100 of FIG. 1 for dynamically generating and associating a generated speed limit with a recommended lane assignment, in accordance with embodiments of the present invention. Each of the steps in the algorithm of FIG. 2 may be enabled and executed in any order by a computer processor executing computer code. In step 400, a dynamically changing data stream is received by a computer processor of a computing system from a plurality of vehicles currently in motion on a roadway within a specified geographical perimeter. The dynamically changing data stream may be dynamically received via sensors and an on board computer located in each vehicle. The computing system may include a centralized computing system associated with a specified geographical region (e.g., geographical perimeter 1045 in FIG. 1). The computing system may comprise a single computing system located internal to or external to a vehicle. Alternatively, the computing system may comprise a multiple computing systems located internal to or external to each vehicle. The dynamically changing data stream comprises data that includes parameters associated with the plurality of vehicles. The parameters may include, inter alia, specifications, classes, and weight verses power ratios for each vehicle, a year of the vehicles, current climatic conditions, a maintenance quality with respect to the roadway. In step 402, the data is analyzed. In step 404, differing speed limits for the vehicles are dynamically defined (and continuously updated) based on results of the analysis of step 402. In step 408, recommended lane assignments for the vehicles are dynamically defined (and continuously updated) based on results of the analysis of step 402. Each recommended lane assignment specifies a recommended lane of travel on the roadway for each vehicle. In step 410, velocity ranges for the vehicles with respect to the recommended lane assignments are dynamically defined (and continuously updated) based on each recommended lane of travel and the speed limits. Each velocity range comprises a minimum speed and a maximum speed limit with respect to an associated recommended lane assignment and an associated vehicle. Each associated speed limit, associated recommended lane assignment, and associated velocity range generate (in combination) an optimal traffic flow pattern for the vehicles with respect to the roadway. In step 412, it is determined if any of the vehicles have disabled communications with the computer. If in step 412, it is determined that a vehicle has disabled communications with the computer then in step 414, the vehicle is identified and an alert (indicating disabled communications) is transmitted to an authorized party. If in step 412, it is determined that no vehicles have disabled communications with the computer then in step 418, an associated speed limit, an associated recommended lane assignment, and an associated velocity range is transmitted to each vehicle. Each vehicle presents each associated speed limit, each associated recommended lane assignment, and each associated velocity range to an associated driver of each associated vehicle and the step 400 is repeated to receive the dynamically changing data stream for evaluation.

Figure 5:
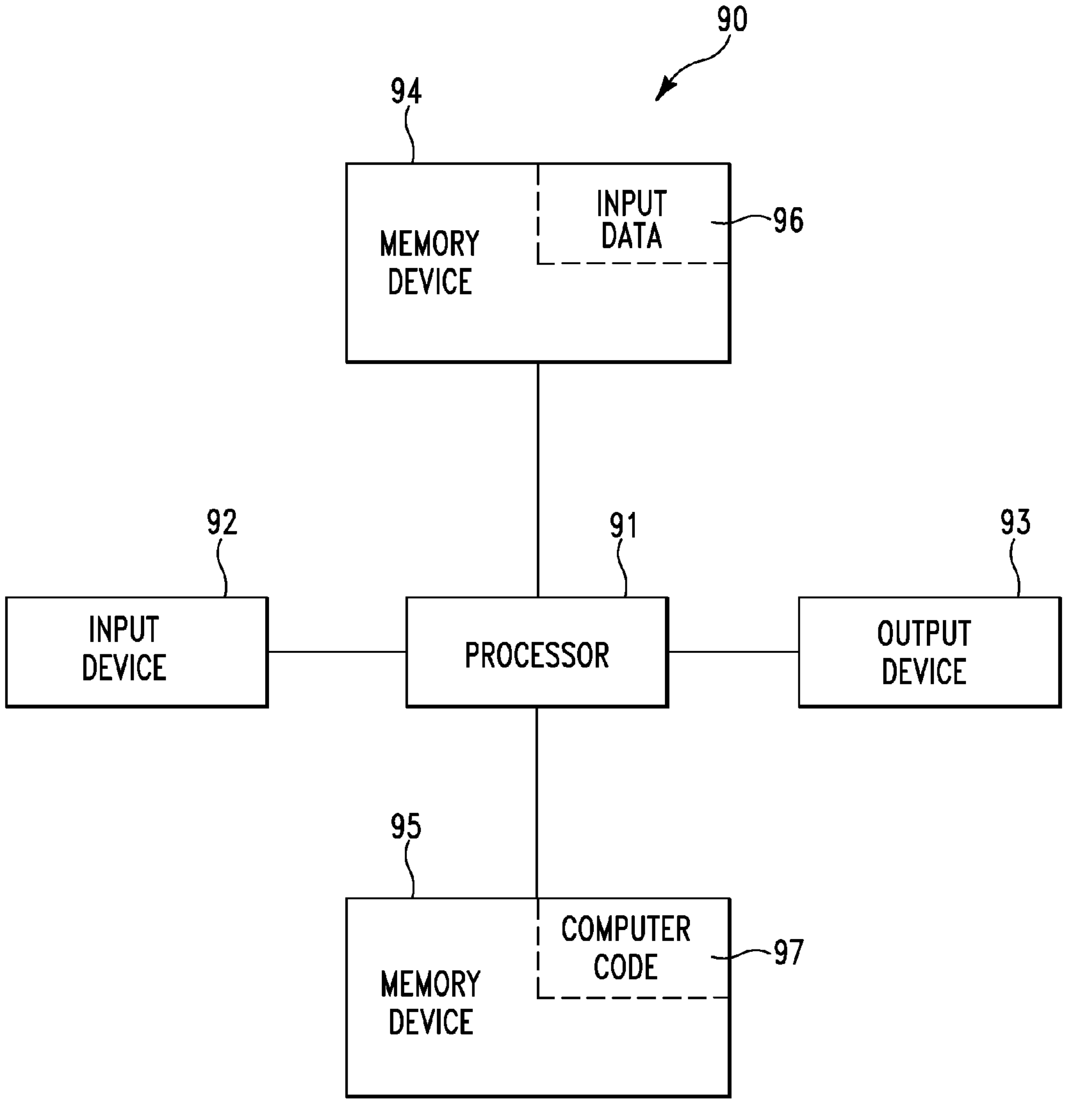
FIG. 5 illustrates a computer apparatus used by the system of FIG. 1 for dynamically generating and associating a generated speed limit with a recommended lane assignment, in accordance with embodiments of the present invention.

FIG. 5 illustrates a computer apparatus 90 (e.g., any of the computing systems of FIG. 1 and/or computer 212 of FIG. 2) used by system 2 of FIG. 1 for dynamically generating and associating a generated speed limit with a recommended lane assignment, in accordance with embodiments of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 4) for dynamically generating and associating a generated speed limit with a recommended lane assignment. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may include the algorithm of FIG. 4 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

Still yet, any of the components of the present invention could be created, integrated, hosted, maintained, deployed, managed, serviced, etc. by a service supplier who offers to dynamically generate and associate a generated speed limit with a recommended lane assignment. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for dynamically generating and associating a generated speed limit with a recommended lane assignment. In another embodiment, the invention provides a business method that performs the process steps of the invention on a subscription, advertising, and/or fee basis. That is, a service supplier, such as a Solution Integrator, could offer to dynamically generate and associate a generated speed limit with a recommended lane assignment. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:

dynamically receiving, by a computer processor of a computing system from a plurality of vehicles currently in motion on a roadway, a dynamically changing data stream comprising data comprising parameters associated with said plurality of vehicles, wherein said computing system comprises a centralized computing system associated with a specified geographical region;

analyzing, by said computer processor, said data;

dynamically defining, by said computer processor based on results of said analyzing, speed limits for said plurality of vehicles;

dynamically defining, by said computer processor based on results of said analyzing, recommended lane assignments for said plurality of vehicles, wherein each recommended lane assignment of said recommended lane assignments specifies a recommended lane of travel on said roadway for each said vehicle;

dynamically defining, by said computer processor based on each said recommended lane of travel and said speed limits, velocity ranges for said plurality of vehicles with respect to said recommended lane assignments; and transmitting, by said computer processor to each said vehicle, an associated speed limit of said speed limits, an associated recommended lane assignment of said recommended lane assignments, and an associated velocity range of said velocity ranges, wherein each said vehicle presents each said associated speed limit, each said associated recommended lane assignment, and each said associated velocity range to an associated driver of each associated vehicle of said plurality of vehicles.

2. The method of claim 1, wherein said parameters comprise specifications, classes, and weight verses power ratios for each said vehicle, and wherein said parameters further comprise current climatic conditions and a maintenance quality with respect to said roadway.

3. The method of claim 1, wherein said plurality of vehicles are located within a specified geographical perimeter associated with said specified geographical region.

4. The method of claim 1, wherein each velocity range said velocity ranges comprises a minimum speed and a speed limit of said speed limits with respect to an associated recommended lane assignment and an associated vehicle.

5. The method of claim 1, wherein each said associated speed limit, each said associated recommended lane assignment, and each said associated velocity range generate an optimal traffic flow pattern for said plurality of vehicles with respect to said roadway.

6. The method of claim 1, wherein said dynamically changing data stream comprises additional data comprising different parameters associated with said plurality of vehicles;

additionally analyzing, by said computer processor, said additional data;

dynamically defining, by said computer processor based on results of said additionally analyzing, additional speed limits for said plurality of vehicles, said additional speed limits differing from said speed limits;

dynamically defining, by said computer processor based on results of said additionally analyzing, additional recommended lane assignments for said plurality of vehicles, wherein each additional recommended lane assignment of said additional recommended lane assignments specifies a differing recommended lane of travel on said roadway for each said vehicle;

dynamically defining, by said computer processor based on each said additional recommended lane of travel and said additional speed limits, additional differing velocity ranges for said plurality of vehicles with respect to said recommended additional lane assignments; and transmitting, by said computer processor to each said vehicle, a differing associated speed limit of said additional speed limits, a differing associated recommended lane assignment of said additional recommended lane assignments, and a differing associated velocity range of said additional differing velocity ranges, wherein each said vehicle presents each said differing associated speed limit, each said differing associated recommended lane assignment, and each said differing associated velocity range to said associated driver of each sad associated vehicle of said plurality of vehicles.

7. The method of claim 1, wherein said dynamically changing data stream is dynamically received via sensors and an on board computer located in each said vehicle.

8. The method of claim 1, further comprising:

determining, by said computer processor, that a first vehicle of said plurality of vehicles has disabled communications with said computer processor;

receiving, by said computer processor in response to said determining that said first vehicle has disabled communications with said computer processor, identification data identifying said first vehicle; and transmitting, by said computer processor to an authorized party, an alert indicating that said first vehicle is not in communication with said computer processor.

9. The method of claim 1, further comprising:

providing at least one support service for at least one of creating, integrating, hosting, maintaining, and deploying computer-readable code in the computing system, said code being executed by the computer processor to implement: said dynamically receiving, said analyzing, said dynamically defining said speed limits, said dynamically defining said recommended lane assignments, said dynamically defining said velocity ranges, and said transmitting.

10. A computing system comprising a computer processor coupled to a computer-readable memory unit, said memory unit comprising instructions that when executed by the computer processor implements a method comprising:

dynamically receiving, by said computer processor from a plurality of vehicles currently in motion on a roadway, a dynamically changing data stream comprising data comprising parameters associated with said plurality of vehicles, wherein said computing system comprises a centralized computing system associated with a specified geographical region;

analyzing, by said computer processor, said data;

dynamically defining, by said computer processor based on results of said analyzing, speed limits for said plurality of vehicles;

dynamically defining, by said computer processor based on results of said analyzing, recommended lane assignments for said plurality of vehicles, wherein each recommended lane assignment of said recommended lane assignments specifies a recommended lane of travel on said roadway for each said vehicle;

dynamically defining, by said computer processor based on each said recommended lane of travel and said speed limits, velocity ranges for said plurality of vehicles with respect to said recommended lane assignments; and transmitting, by said computer processor to each said vehicle, an associated speed limit of said speed limits, an associated recommended lane assignment of said recommended lane assignments, and an associated velocity range of said velocity ranges, wherein each said vehicle presents each said associated speed limit, each said associated recommended lane assignment, and each said associated velocity range to an associated driver of each associated vehicle of said plurality of vehicles.

11. The computing system of claim 10, wherein said parameters comprise specifications, classes, and weight verses power ratios for each said vehicle, and wherein said parameters further comprise current climatic conditions and a maintenance quality with respect to said roadway.

12. The computing system of claim 10, wherein said plurality of vehicles are located within a specified geographical perimeter associated with said specified geographical region.

13. The computing system of claim 10, wherein each velocity range said velocity ranges comprises a minimum speed and a speed limit of said speed limits with respect to an associated recommended lane assignment and an associated vehicle.

14. The computing system of claim 10, wherein each said associated speed limit, each said associated recommended lane assignment, and each said associated velocity range generate an optimal traffic flow pattern for said plurality of vehicles with respect to said roadway.

15. The computing system of claim 10, wherein said dynamically changing data stream comprises additional data comprising different parameters associated with said plurality of vehicles, and wherein said method further comprises:

additionally analyzing, by said computer processor, said additional data;

dynamically defining, by said computer processor based on results of said additionally analyzing, additional speed limits for said plurality of vehicles, said additional speed limits differing from said speed limits;

dynamically defining, by said computer processor based on results of said additionally analyzing, additional recommended lane assignments for said plurality of vehicles, wherein each additional recommended lane assignment of said additional recommended lane assignments specifies a differing recommended lane of travel on said roadway for each said vehicle;

dynamically defining, by said computer processor based on each said additional recommended lane of travel and said additional speed limits, additional differing velocity ranges for said plurality of vehicles with respect to said recommended additional lane assignments; and transmitting, by said computer processor to each said vehicle, a differing associated speed limit of said additional speed limits, a differing associated recommended lane assignment of said additional recommended lane assignments, and a differing associated velocity range of said additional differing velocity ranges, wherein each said vehicle presents each said differing associated speed limit, each said differing associated recommended lane assignment, and each said differing associated velocity range to said associated driver of each sad associated vehicle of said plurality of vehicles.

16. The computing system of claim 10, wherein said dynamically changing data stream is dynamically received via sensors and an on board computer located in each said vehicle.

17. The computing system of claim 10, wherein said method further comprises:

determining, by said computer processor, that a first vehicle of said plurality of vehicles has disabled communications with said computer processor;

receiving, by said computer processor in response to said determining that said first vehicle has disabled communications with said computer processor, identification data identifying said first vehicle; and transmitting, by said computer processor to an authorized party, an alert indicating that said first vehicle is not in communication with said computer processor.

18. A computer program product, comprising a computer readable hardware storage device storing a computer readable program code, said computer readable program code comprising an algorithm that when executed by a computer processor of a computer system implements a method, said method comprising:

dynamically receiving, by said computer processor from a plurality of vehicles currently in motion on a roadway, a dynamically changing data stream comprising data comprising parameters associated with said plurality of vehicles, wherein said computing system comprises a centralized computing system associated with a specified geographical region;

analyzing, by said computer processor, said data;

dynamically defining, by said computer processor based on results of said analyzing, speed limits for said plurality of vehicles;

dynamically defining, by said computer processor based on results of said analyzing, recommended lane assignments for said plurality of vehicles, wherein each recommended lane assignment of said recommended lane assignments specifies a recommended lane of travel on said roadway for each said vehicle;

dynamically defining, by said computer processor based on each said recommended lane of travel and said speed limits, velocity ranges for said plurality of vehicles with respect to said recommended lane assignments; and transmitting, by said computer processor to each said vehicle, an associated speed limit of said speed limits, an associated recommended lane assignment of said recommended lane assignments, and an associated velocity range of said velocity ranges, wherein each said vehicle presents each said associated speed limit, each said associated recommended lane assignment, and each said associated velocity range to an associated driver of each associated vehicle of said plurality of vehicles.

19. The computer program product of claim 18, wherein said parameters comprise specifications, classes, and weight verses power ratios for each said vehicle, and wherein said parameters further comprise current climatic conditions and a maintenance quality with respect to said roadway.

20. The computer program product of claim 18, wherein said plurality of vehicles are located within a specified geographical perimeter associated with said specified geographical region.

* * * * *